US007621645B2

(12) United States Patent
Nakagawa et al.

(10) Patent No.: US 7,621,645 B2
(45) Date of Patent: Nov. 24, 2009

(54) PROJECTOR DEVICE

(75) Inventors: Norio Nakagawa, Neyagawa (JP);
Toshihiro Saruwatari, Kishiwada (JP);
Katsumi Tanaka, Suita (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 538 days.

(21) Appl. No.: 11/492,972

(22) Filed: Jul. 26, 2006

(65) Prior Publication Data

US 2007/0024817 A1 Feb. 1, 2007

(30) Foreign Application Priority Data

Jul. 29, 2005 (JP) .............................. 2005-220629

(51) Int. Cl.
*H01J 5/16* (2006.01)
*H01J 61/40* (2006.01)
*H01K 1/26* (2006.01)
*H01K 1/30* (2006.01)
*G03B 21/16* (2006.01)
*F21V 29/00* (2006.01)

(52) U.S. Cl. .......................... 353/61; 362/294; 313/113
(58) Field of Classification Search .................. 353/57, 353/58, 60, 61, 119; 313/113; 362/264, 362/373, 294
See application file for complete search history.

(56) References Cited

U.S. PATENT DOCUMENTS

| 6,485,167 | B2* | 11/2002 | Liang et al. ................... 362/373 |
| 6,698,899 | B2 | 3/2004 | Yamada et al. |
| 6,739,831 | B2* | 5/2004 | Hsu et al. ...................... 415/60 |
| 6,759,794 | B2 | 7/2004 | Wilson et al. |
| 7,258,465 | B2* | 8/2007 | Morinaga ..................... 362/294 |
| 7,380,965 | B2* | 6/2008 | Nakashita ..................... 362/373 |
| 2004/0169825 | A1* | 9/2004 | Ozawa et al. .................. 353/61 |

FOREIGN PATENT DOCUMENTS

| CN | 1344968 A | 4/2002 |
| JP | 7-281296 A | 10/1995 |

(Continued)

OTHER PUBLICATIONS

Taiwan Office Action issued on Feb. 6, 2009 for corresponding Taiwanese Patent Application No. 95117429. Partial translation included.

*Primary Examiner*—William C Dowling
*Assistant Examiner*—Ryan Howard
(74) *Attorney, Agent, or Firm*—Westerman, Hattori, Daniels & Adrian, LLP (57) ABSTRACT

A liquid crystal projector device of the present invention includes a lamp unit having a lamp and a reflector, and a cooling fan for cooling the lamp unit. The reflector includes a reflecting portion having a parabolic reflecting surface, and a plurality of side walls extending from the reflecting portion to surround the lamp. A first side wall of the plurality of side walls is provided with a first air intake opening and a second air intake opening for introducing air delivered from the cooling unit toward the lamp, at both sides of a plane including a central axis of the lamp and orthogonal to the first side wall. A wind blocking wall is defined between both air intake openings. An air discharge opening is formed on a second side wall opposed to the first side wall.

2 Claims, 10 Drawing Sheets

FOREIGN PATENT DOCUMENTS

| | | |
|---|---|---|
| JP | 10-223023 A | 8/1998 |
| JP | 2002-150831 A | 5/2002 |
| JP | 2002-334609 A | 11/2002 |
| JP | 2002-367417 A | 12/2002 |
| JP | 2005-173085 A | 6/2005 |
| JP | 2005-316177 A | 11/2005 |
| TW | 301555 A | 10/2008 |

* cited by examiner

PROJECTOR DEVICE

The priority application Number 2005-220629 upon which this patent application is based is hereby incorporated by reference.

BACKGROUND OF THE INVENTION

1. Field of the Invention

The present invention relates to a projector device adapted to guide light from a light source to an optical system to generate image light for magnification projection on a forward screen.

2. Description of Related Art

A conventional projector device of this type includes a casing having disposed therein a light source and an optical system including a polarization beam splitter, a polarizing plate, liquid crystal panels, a projection lens, etc. A discharge emission lamp unit such as a halogen lamp and a metal halide lamp is used as the light source.

The lamp unit includes a lamp and a reflector for reflecting light emitted from the lamp toward the optical system. The lamp is formed by enclosing a luminous body inside a quartz bulb. The lamp is cooled by a cooling unit because the lamp has a shortened life when the lamp has a temperature exceeding a limit temperature.

The reflector of the lamp unit has a reflecting portion having a quadratically curved reflecting surface for reflecting the light emitted from the lamp toward the optical system, and a plurality of side walls extending from the reflecting portion toward the optical system to surround the lamp. The cooling unit is attached to a first side wall of the plurality of side walls.

A blower opening for introducing air delivered from the cooling unit toward a light emitting portion of the lamp is formed on the first side wall of the reflector, while a discharge opening for discharging the high temperature air outside the reflector is provided on a second side wall opposed to the first side wall in a position opposed to the blower opening (see JP 7-281296, A). Because the lamp could explode due to long use, the blower opening and the discharge opening are constituted of a plurality of small holes with a small opening area in order to prevent broken pieces of the lamp from flying outside the reflector upon the explosion.

The lamp in the above conventional lamp unit is cooled by the air introduced inside the reflector through the blower opening and flowing around the lamp. However, the above conventional lamp unit has a problem of the lamp being unable to be sufficiently cooled despite a sufficient air volume being given inside the reflector through the blower opening.

SUMMARY OF THE INVENTION

An object of the present invention is to provide a projector device in which the lamp can be effectively cooled.

A projector device of the present invention includes a casing 1 having disposed therein a lamp unit 4 including a lamp 41 and a reflector 46, a cooling unit including a cooling fan 42 for cooling the lamp unit 4, and an optical system for generating color image light with the lamp unit 4 serving as a light source, the reflector 46 having a reflecting portion 46a having a reflecting surface for reflecting light emitted from the lamp 41 toward the optical system, and a plurality of side walls 46b-46e extending from the reflecting portion 46a toward the optical system to surround the lamp 41. A first side wall 46b of the plurality of side walls 46b-46e is provided with an air intake portion for introducing air delivered from the cooling unit toward the lamp 41, with a second side wall 46c opposed to the first side wall 46b being provided with an air discharge opening 55 opposed to the air intake portion.

The air intake portion of the reflector 46 is provided with a first air intake opening 53 and a second air intake opening 54 at both sides of a plane including a central axis of the lamp 41 and orthogonal to the first side wall 46b, with a wind blocking wall 56 being defined between both air intake openings 53, 54.

Because the first air intake opening 53 and second air intake opening 54 in the above projector device of the present invention are provided at both sides of the plane including the central axis of the lamp 41 and orthogonal to the first side wall 46b of the reflector 46 (hereafter referred to as the center plane), with the wind blocking wall 56 defined between both intake openings 53, 54, the air to be introduced from the cooling unit inside the reflector 46 is forced to diverge to both sides of the center plane.

Because the lamp unit of the conventional projector device is provided with no wind blocking wall 56, the air introduced inside the reflector 46 partly flows straight toward the opposed air discharge opening. Consequently, the light emitting portion 41b of the lamp 41 cannot be sufficiently cooled.

In contrast, according to the projector device of the present invention, less air than a conventional amount flows straight toward the air discharge opening 55 because the air introduced inside the reflector 46 is forced to diverge to both sides of the center plane. This causes more air than a conventional amount to flow around the lamp 41. Consequently, the lamp 41 can be sufficiently cooled.

Specifically, a first opening 47a for introducing the air delivered from the cooling unit toward a light emitting portion 41b of the lamp 41 is formed on the first side wall 46b of the reflector 46, while a second opening 47b opposed to the first opening 47a is formed on the second side wall 46c, the lamp unit 4 having attached thereto a cover member 5 for covering the first opening 47a and second opening 47b of the reflector 46, the cover member 5 having the first air intake opening 53 and the second air intake opening 54 provided in a position opposed to the first opening 47a, and the air discharge opening 55 provided in a position opposed to the second opening 47b.

The first opening 47a and second opening 47b of the reflector 46 in the lamp unit of the conventional projector device have respective separate cover members attached thereto. In contrast, according to the specific configuration, the first opening 47a and second opening 47b of the reflector 46 can be covered by the single cover member attached to the lamp unit 4, and therefore the number of components is reduced. This can result in simplification of the assembly process and cost reduction.

Specifically, the first air intake opening 53, the second air intake opening 54 and the air discharge opening 55 are each constituted of a plurality of small holes 57, 58, and each of the small holes 57 constituting the first intake opening 53 and the second intake opening 54 has an opening area larger than that of each of the small holes 58 constituting the air discharge opening 55.

With the specific configuration, the larger is the opening area of each of the small holes 57 constituting the first air intake opening 53 and the second air intake opening 54, the smaller is a pressure loss occurring when the air delivered from the cooling unit passes through each of the small holes 57. This increases cooling effect for the lamp 41.

Because the air delivered from the cooling unit flows inside the reflector 46 from the first air intake opening 53 and the second air intake opening 54 toward the air discharge opening 55, small broken pieces flying toward the first air intake opening 53 and the second air intake opening 54 upon explosion of the lamp 41 will be swept by the air flow toward the air discharge opening 55. Therefore, the small broken pieces are highly unlikely to fly outside the reflector 46 from the first air intake opening 53 and the second air intake opening 54.

Accordingly, it is possible to suppress to a minimum the pressure loss occurring when the air delivered from the cooling unit passes through each of the small holes 57 constituting the first air intake opening 53 and the second air intake opening 54, while preventing the broken pieces of the lamp 41 from flying outside the reflector 46 upon the explosion, by setting the opening area of each of the small holes 57 constituting the first air intake opening 53 and the second air intake opening 54 smaller than the opening area of each of the small holes 58 constituting the air discharge opening 55.

As described above, according to the projector device of the present invention, the lamp can be effectively cooled, and therefore the lamp can have a prolonged life.

DETAILED DESCRIPTION OF THE INVENTION

The present invention embodied in a liquid crystal projector device will be specifically described below with reference to the drawings. In the description given below, the image projection direction of the liquid crystal projector device shown in FIG. 1 is defined as the forward direction, and right and left are defined by facing the front face of the liquid crystal projector device.

Overall Construction

Figure 1:
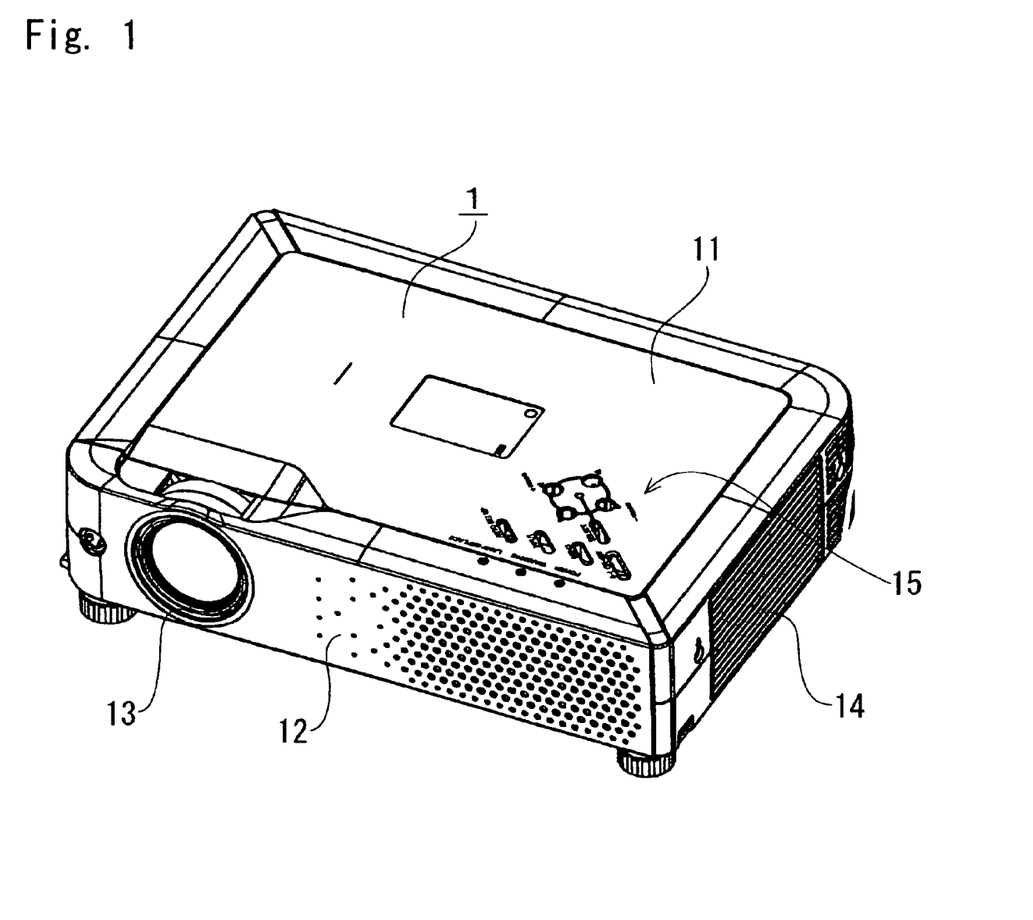
FIG. 1 is a perspective view of a liquid crystal projector device of the present invention.

As shown in FIG. 1, the liquid crystal projector device of the present invention includes a flat casing 1 including a lower half case 12 and an upper half case 11. A manipulation portion 15 including a plurality of manipulation buttons is disposed on a surface of the casing 1, while a projection window 13 is provided on the front face of the casing 1. A vent 14 for discharging the air in the casing 1 to the outside is provided on the right side wall of the casing 1.

Figure 2:
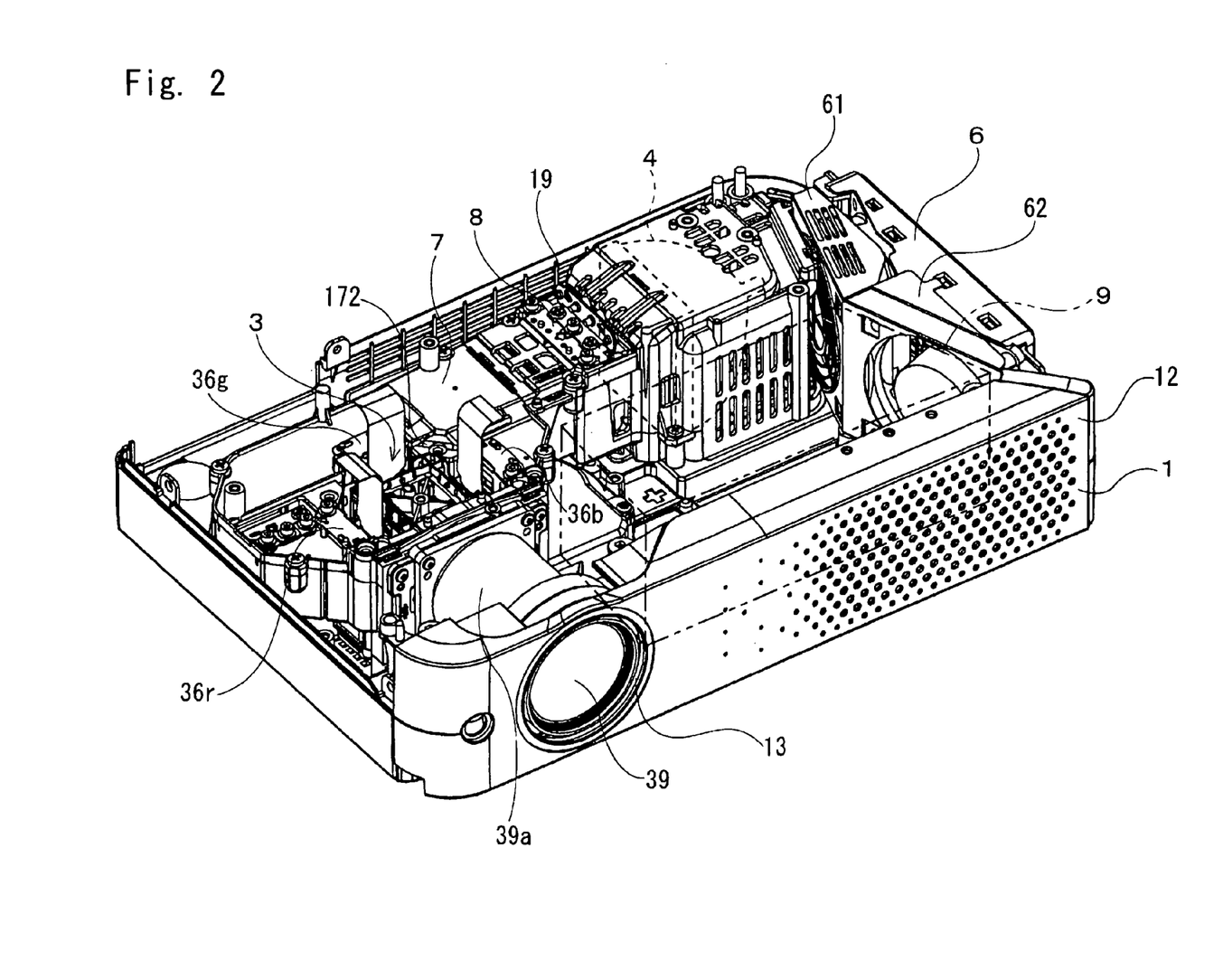
FIG. 2 is a perspective view showing the liquid crystal projector device with an upper half case thereof removed therefrom.
Figure 3:
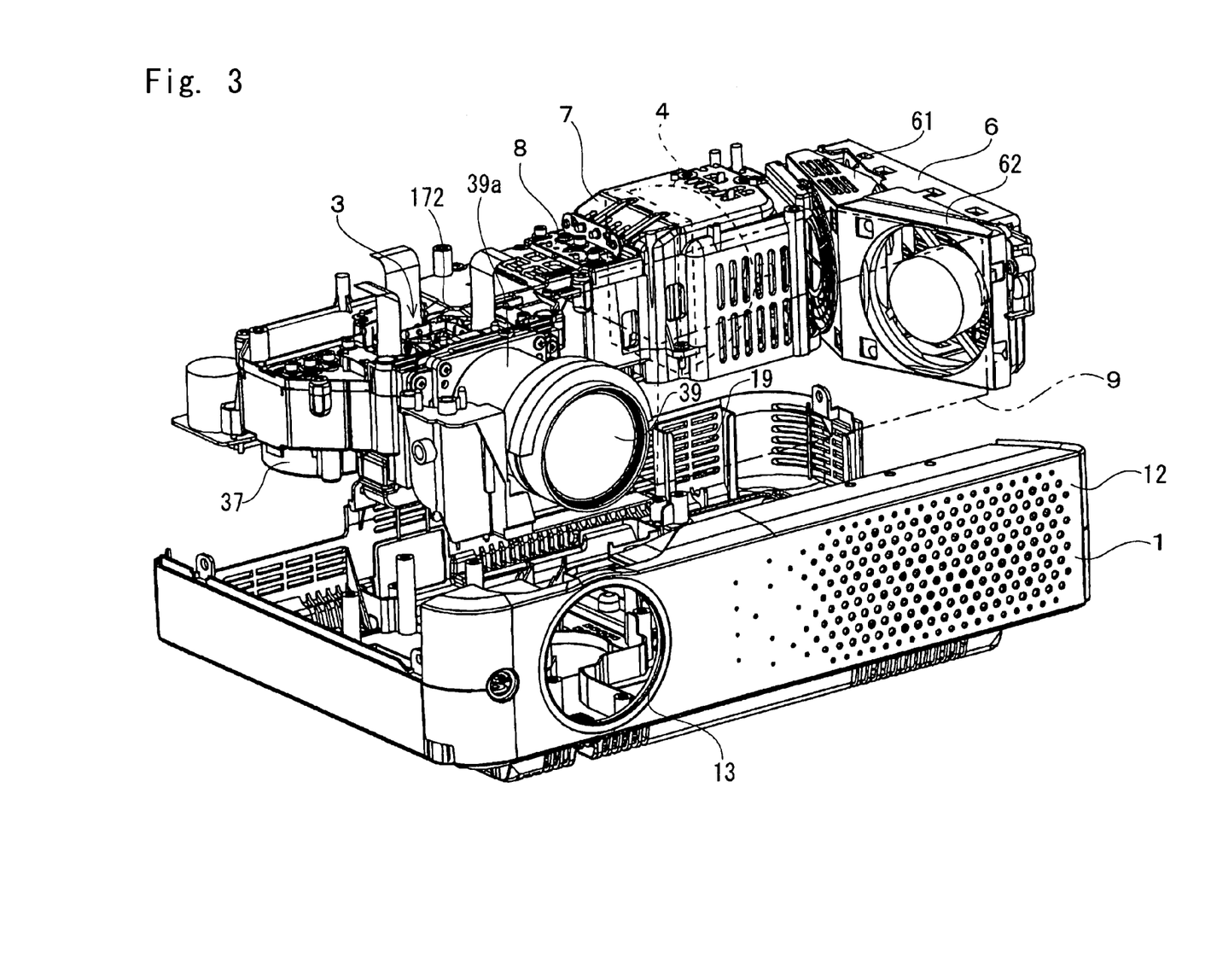
FIG. 3 is an exploded perspective view showing the liquid crystal projector device with the upper half case removed therefrom.

As shown in FIG. 2 and FIG. 3, a synthetic resin optical system holding case 7 extending in an approximate L-shape is disposed inside the casing 1. Disposed inside the optical system holding case 7 are a lamp unit 4 for serving as a light source, an optical system 2 (see FIG. 4) for separating white light emitted from the lamp unit 4 into light of three primary colors, and an image synthesizer 3 for irradiating liquid crystal panels for three primary colors with the light of three primary colors to generate image light of three primary colors, and synthesizing the generated image light of three primary colors into color image light. The lamp unit 4 is contained at the right end in the optical system holding case 7, while the image synthesizer 3 is contained at the forward end in the optical system holding case 7. The optical system 2 is disposed on a light path in the optical system holding case 7 from the lamp unit 4 to the image synthesizer 3.

The optical system holding case 7 has a forward end edge thereof coupled to the base end of a cylinder 39a for holding a projection lens 39. Further, a power unit 9 is placed inside the casing 1 at the forward side of the optical system holding case 7.

As shown in FIG. 2, an exhaust system 6 including a first exhaust fan 61 and a second exhaust fan 62 is attached to the right side wall of the lower half case 12. The first exhaust fan 61 is placed with an inlet direction thereof toward the lamp unit 4, while the second exhaust fan 62 is placed with an inlet direction thereof toward the power unit 9.

The liquid crystal projector device of the present invention will be described below in detail in construction.

Optical System 2

Figure 4:
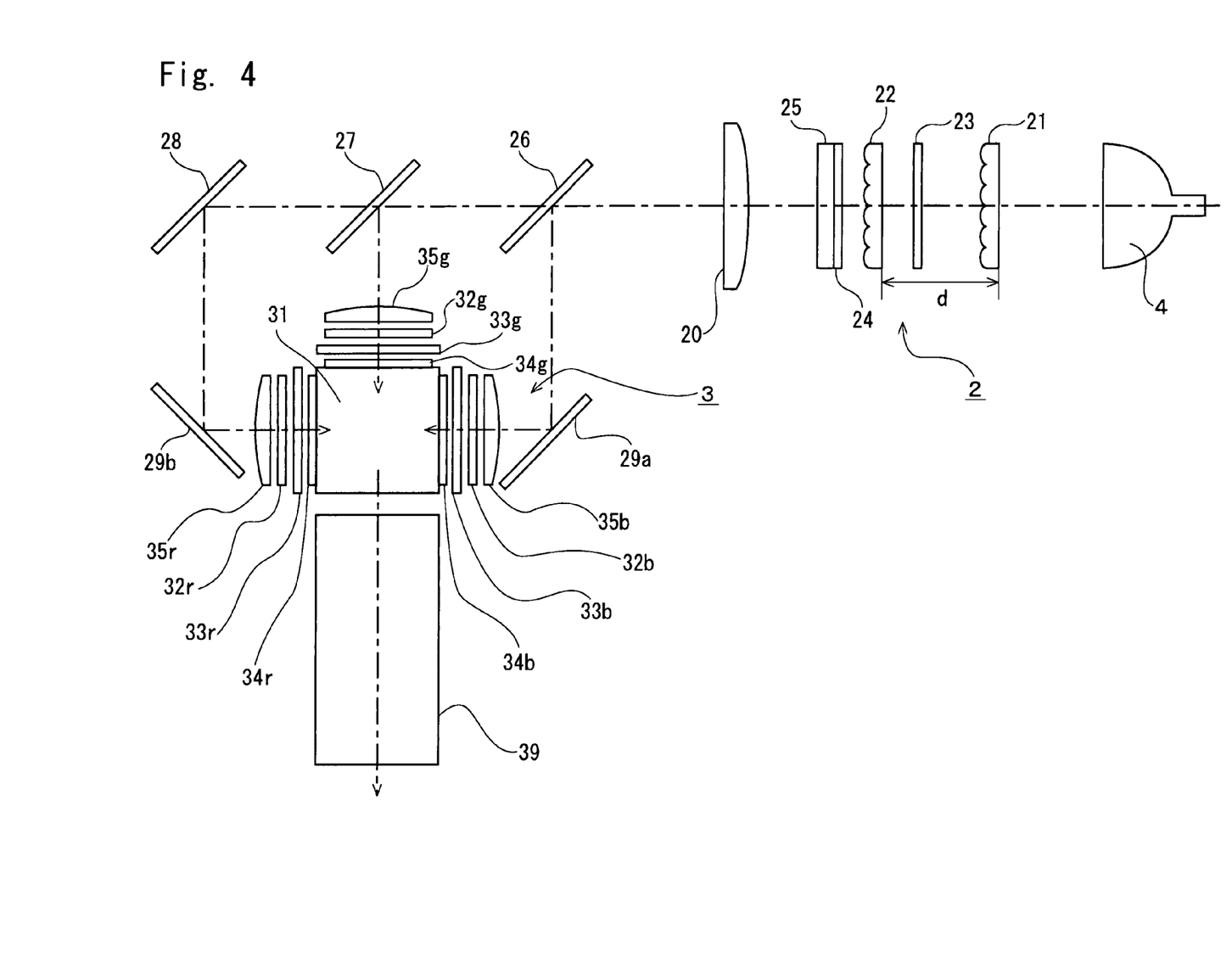
FIG. 4 illustrates an optical system of the liquid crystal projector device.

As shown in FIG. 4, white light from the lamp unit 4 is guided through a first integrator lens 21, a former stage slit plate 23, a second integrator lens 22, a latter stage slit plate 24, a polarization beam splitter 25 and a field lens 20 to a first dichroic mirror 26.

The first integrator lens 21 and the second integrator lens 22 are made of a heat resistance glass fry-eye lens, and have a function of uniformizing illuminance distribution of the white light emitted from the lamp unit 4. The former stage slit plate 23 and the latter stage slit plate 24 are made of an aluminum thin plate, and have a function of blocking unnecessary incident light toward the polarization beam splitter 25. The polarization beam splitter 25 has a function of extracting only one component wave out of P- and S-waves of light.

The light having passed through the polarization beam splitter 25 reaches through the field lens 20 to the first dichroic mirror 26. The first dichroic mirror 26 has a function of reflecting only a blue component of light and passing red and green components therethrough. A second dichroic mirror 27 has a function of reflecting the green component of light and passing the red component therethrough, and a field mirror 28 has a function of reflecting the red component. Thus, the white light emitted from the lamp unit 4 is separated by the first and second dichroic mirrors 26, 27 into blue light, green light and red light, and guided to the image synthesizer 3.

Image Synthesizer 3

Figure 5:
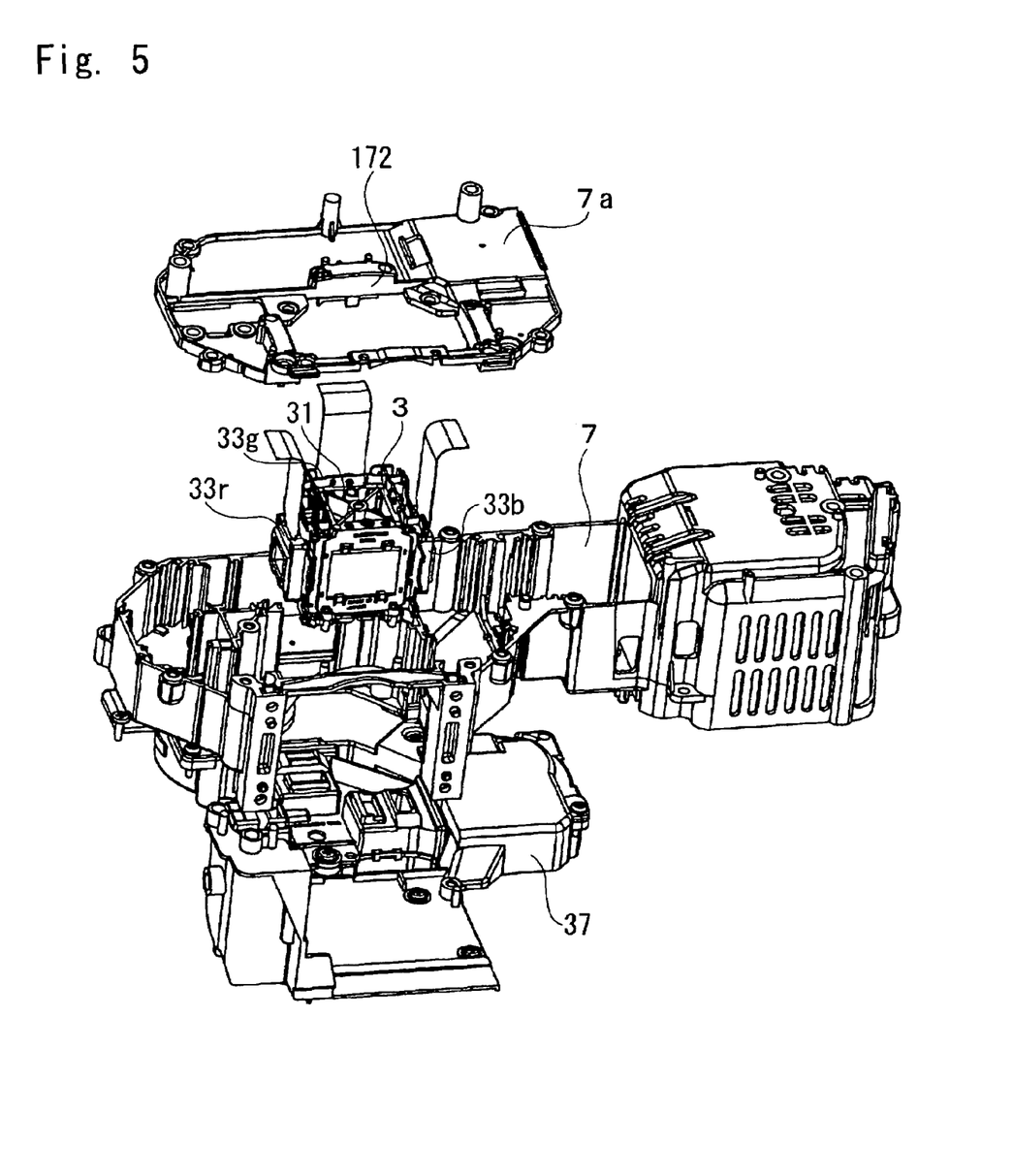
FIG. 5 is an exploded perspective view of an optical system holding case, a light synthesizer and a cooling unit.

As shown in FIG. 5, the image synthesizer 3 includes a liquid crystal panel for blue 33b, a liquid crystal panel for green 33g and a liquid crystal panel for red 33r, which are attached to three side faces of a cube-like color synthesis prism 31, respectively. The image synthesizer 3 is contained in the optical system holding case 7 through an opening 172 provided in a lid 7a of the optical system holding case 7. A cooling unit 37 for cooling the image synthesizer 3 is mounted below the image synthesizer 3.

As shown in FIG. 2, incidence polarizing plate holders 36b, 36g, 36r are attached to light incidence sides of the three liquid crystal panels 33b, 33g, 33r, respectively. The incidence polarizing plate holders 36b, 36g, 36r hold three incidence polarizing plates 32b, 32g, 32r described later.

The blue light reflected by the first dichroic mirror 26 and a field mirror 29a shown in FIG. 4 is guided by a field lens 35b through the field lens 35b, the incidence polarizing plate for blue 32b, the liquid crystal panel for blue 33b and an emergence polarizing plate for blue 34b to the color synthesis prism 31.

The green light reflected by the second dichroic mirror 27 is guided by a field lens 35g through the field lens 35g, the incidence polarizing plate for green 32g, the liquid crystal panel for green 33g and an emergence polarizing plate for green 34g to the color synthesis prism 31.

Similarly, the red light reflected by two field mirrors 28, 29b is guided by a field lens 35r of the image synthesizer 3 through the field lens 35r, the incidence polarizing plate for red 32r, the liquid crystal panel for red 33r and an emergence polarizing plate for red 34r to the color synthesis prism 31.

The image light of the three colors guided to the color synthesis prism 31 is synthesized by the color synthesis prism 31, and the resulting color image light is to be magnifyingly projected through the projection lens 39 on a forward screen.

Optical System Holding Case 7

Figure 6:
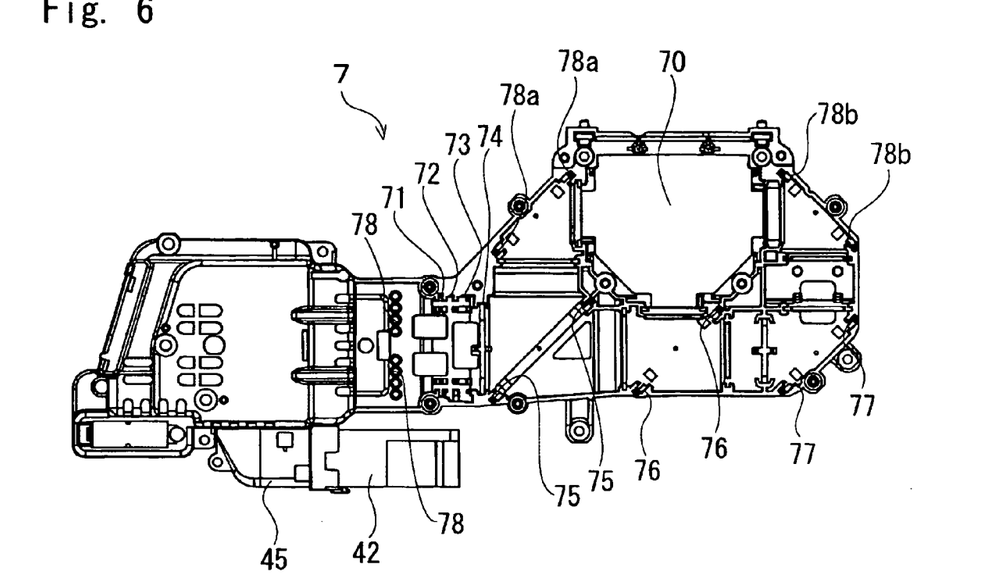
FIG. 6 is a plan view of the optical system holding case.
Figure 7:
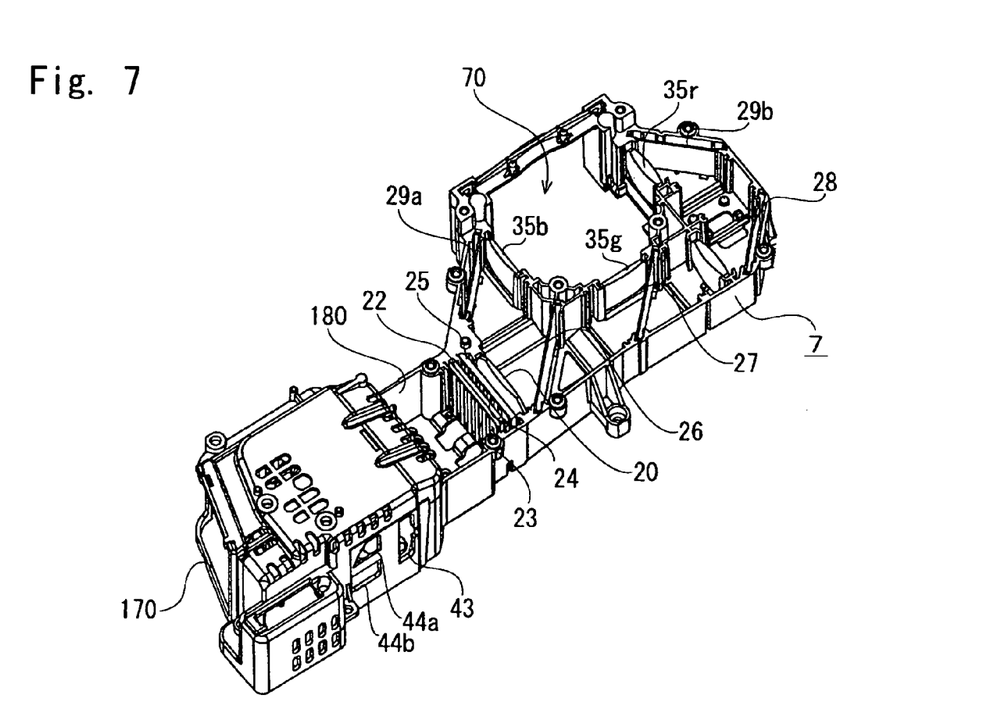
FIG. 7 is a perspective view showing the optical system holding case having optical parts placed therein.
Figure 8:
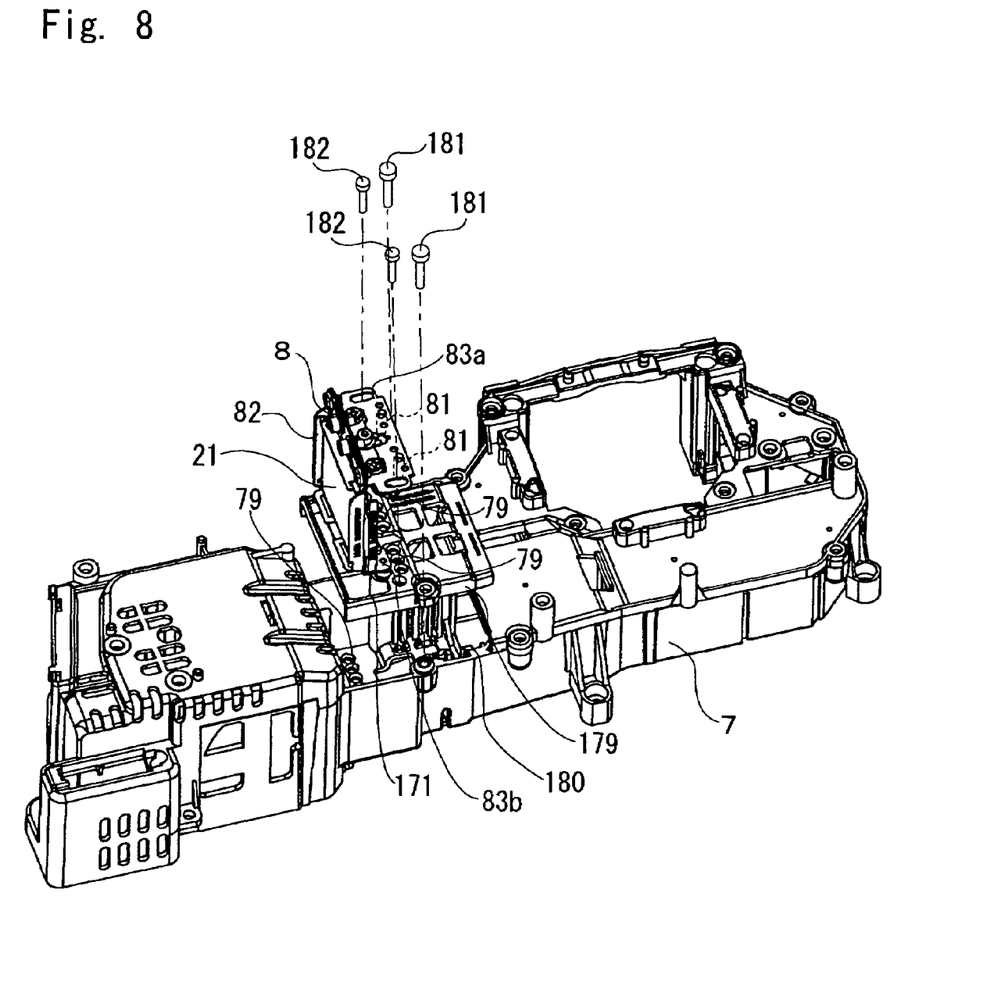
FIG. 8 is an exploded perspective view showing the optical system holding case and a lens holder.

The former stage slit plate 23, the second integrator lens 22, the latter stage slit plate 24, the polarization beam splitter 25, the field lens 20, the first and second dichroic mirrors 26, 27 and the three field mirrors 28, 29a, 29b, which constitute the optical system 2 shown in FIG. 4 are placed in the optical system holding case 7 made of a synthetic resin integral mold shown in FIG. 6 to FIG. 8. The lamp unit 4 is contained at the right end in the optical system holding case 7, while a space 70 is formed at the forward end of the optical system holding case 7. The above described image synthesizer 3 is to be placed inside the space 70.

As shown in FIG. 6, the optical system holding case 7 has both walls along the light path from the lamp unit 4 to the image synthesizer 3, which are formed with a first-setting groove 71 for setting therein the former stage slit plate 23 shown in FIG. 4, a second setting groove 72 for setting the second integrator lens 22 therein, a third setting groove 73 for setting therein the latter stage slit plate 24 and the polarization beam splitter 25 together, a fourth setting groove 74 for setting the field lens 20 therein, fifth and sixth setting grooves 75, 76 for setting therein the first and second dichroic mirrors 26, 27, respectively, and seventh to ninth setting grooves 77, 78a, 78b for setting therein the three field mirrors 28, 29a, 29b, respectively.

FIG. 7 shows the former stage slit plate 23, the second integrator lens 22, the latter stage slit plate 24, the polarization beam splitter 25, the field lens 20, the first and second dichroic mirrors 26, 27 and the three field mirrors 28, 29a, 29b, which constitute the optical system 2, being set in the setting grooves 71-78b, respectively.

As shown in FIG. 8, the first integrator lens 21 is attached to the optical system holding case 7 while being held by a lens holder 8. The lens holder 8 includes a plate metal rectangular frame 82 for holding the first integrator lens 21, and a pair of plate metal attachment plates 83a, 83b extending from the frame 82 along the upper face and lower face of the optical system holding case 7. A pair of positioning pins 81, 81 are protruded downwardly on each of the pair of attachment plates 83a, 83b.

The upper wall of the optical system holding case 7 is provided with an insertion opening 180 for inserting therethrough the former stage slit plate 23, the second integrator lens 22, the latter stage slit plate 24, the polarization beam splitter 25 and the field lens 20, and has a top plate 179 for closing the insertion opening 180 attached thereto.

The top plate 179 is provided with an opening 171 for inserting the lens holder 8 therethrough, and positioning holes 79, 79 for positioning the lens holder 8. The positioning pins 81, 81 protruded on the upper attachment plate 83a for the lens holder 8 are to be fitted into the positioning holes 79, 79 of the top plate 179.

Similarly, the bottom wall of the optical system holding case 7 is also provided with positioning holes 79, 79. The positioning pins 81, 81 protruded on the lower attachment plate 83b for the lens holder 8 are to be fitted into the positioning holes 79, 79.

The lens holder 8 is fixed to the top plate 179 by screws 182, 182 with the positioning pins 81, 81 protruded on the upper attachment plate 83a fitted into the positioning holes 79, 79 of the top plate 179. Then, the positioning pins 81, 81 protruded on the lower attachment plate 83b for the lens holder 8 are fitted into the positioning holes 79, 79 of the bottom wall of the optical system holding case 7, and thereafter the top plate 179 is fixed to the upper wall of the optical system holding case 7 by screws 181, 181 to thereby attach the first integrator lens 21 to a predetermined position on the light path.

Lamp Unit 4

Figure 9:
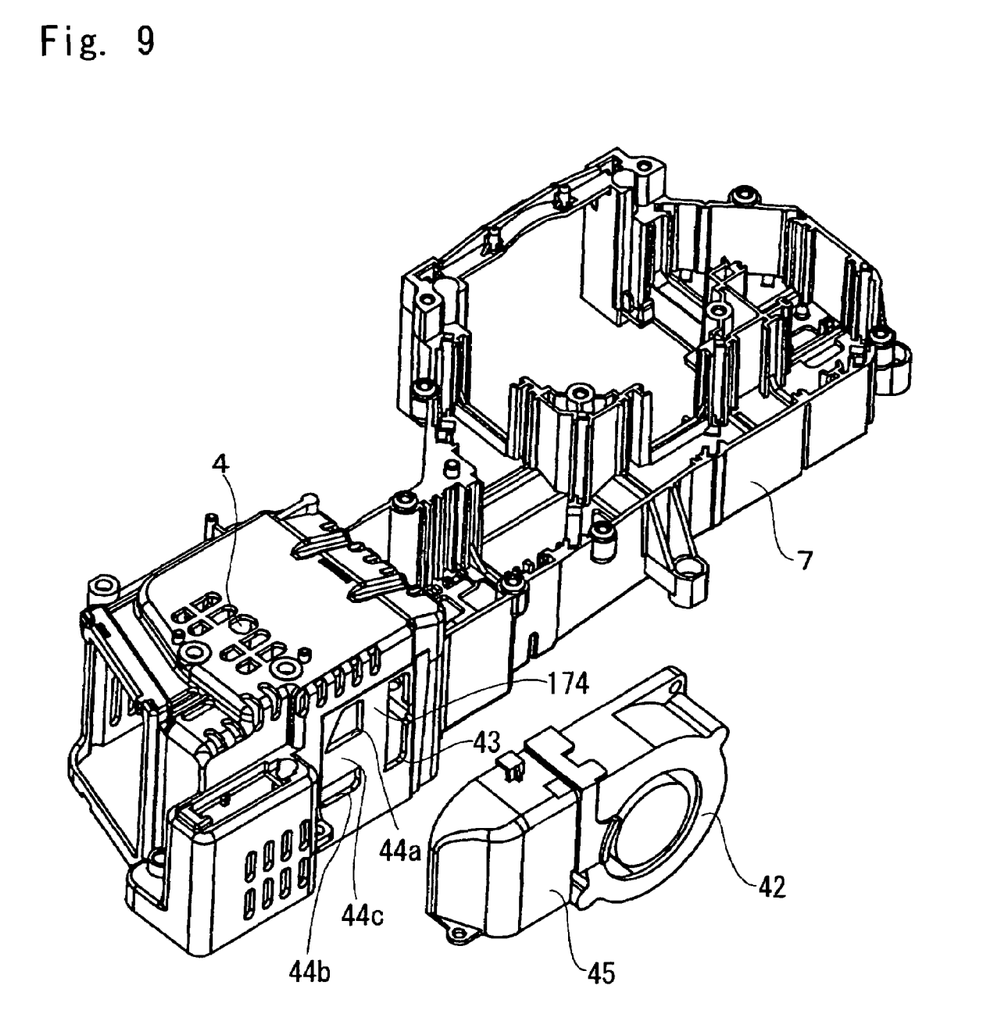
FIG. 9 is an exploded perspective view showing a lamp cooling fan being attached to the optical system holding case.

As shown in FIG. 2, the lamp unit 4 is contained at the right end in the optical system holding case 7. As shown in FIG. 9, an inlet housing 45 is attached to a rear wall 174 at the right end of the optical system holding case 7, and a lamp cooling fan 42 for cooling the lamp unit 4 is attached to an end of the inlet housing 45.

The rear wall 174 at the right end of the optical system holding case 7 is provided with a first intake 43, a second intake 44a and a third intake 44b, which are for drawing air from the lamp cooling fan 42 into the optical system holding case 7. The first intake 43 has a rectangular opening shape long in the vertical direction (width direction). The second intake 44a and the third intake 44b are formed in a rectangle having a width of approximately one-third of that of the first intake 43.

Figure 12:
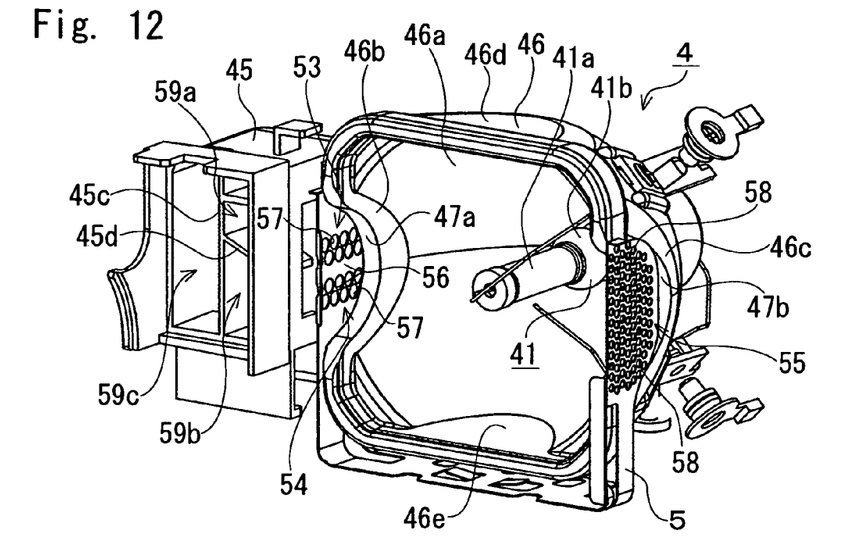
FIG. 12 is a perspective view showing an inside of the lamp unit and an inside of the inlet housing.

As shown in FIG. 12, the lamp unit 4 includes a reflector 46 and a lamp 41 provided at the focal position of the reflector 46. The lamp 41 includes a luminous body sealed inside a columnar quartz bulb 41a. A light emitting portion 41b having the luminous body enclosed therein is in a spherical shape.

The reflector 46 includes a reflecting portion 46a having a parabolic reflecting surface for reflecting light emitted from the lamp 41 toward the optical system 2, and four side walls 46b-46e extending from the reflecting portion 46a toward the optical system 2 to surround the lamp 41. Semicircular openings 47a, 47b are provided on first and second opposed side walls 46b, 46c of the four side walls 46b-46e, respectively. An aluminum cover member 5 for covering both openings 47a, 47b is attached to the reflector 46.

Figure 13:
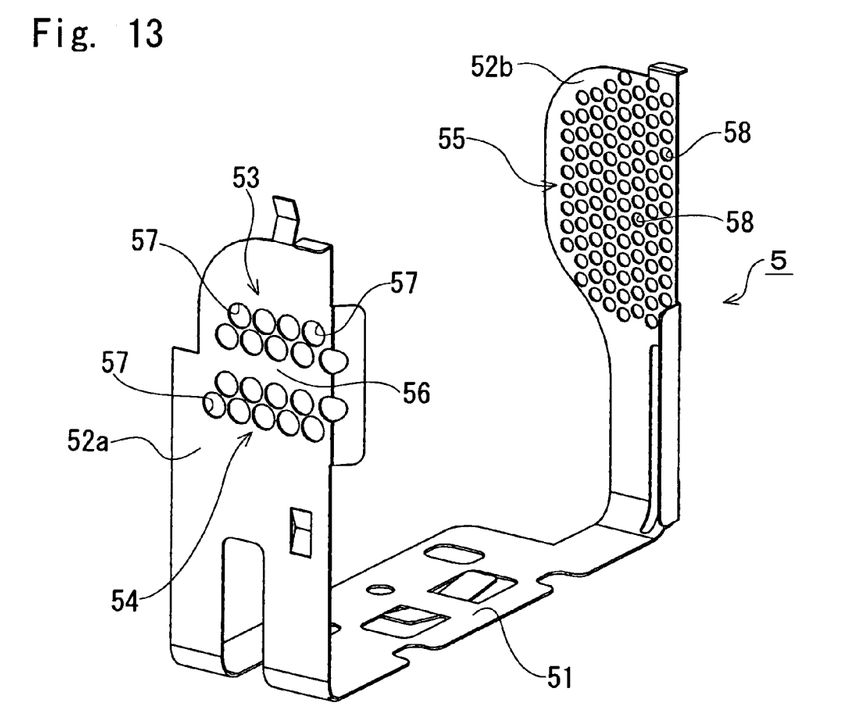
FIG. 13 is an enlarged perspective view of a cover member.

As shown in FIG. 13, the cover member 5 includes an aluminum sheet metal press-molded into a U-shape, and has a bottom plate 51 and a pair of side plates 52a, 52b perpendicularly erected at both ends of the bottom plate 51.

A first air intake opening 53 and a second air intake opening 54 are provided on one side plate 52a of the cover member 5 in a position opposed to one opening 47a of the reflector 46 shown in FIG. 12.

The first air intake opening 53 and the second air intake opening 54 are provided at both sides of a plane including a central axis of the lamp 41 shown in FIG. 12 and orthogonal to the first side wall 46b of the reflector 46. A wind blocking wall 56 is defined by a part of the side plate 52a between both intake openings 53, 54.

An air discharge opening 55 is provided on the other side plate 52b of the cover member 5 in a position opposed to the other opening 47b of the reflector 46 shown in FIG. 12.

The first air intake opening 53 and the second air intake opening 54 are each constituted of a plurality of small holes 57-57. The air discharge opening 55 is constituted of a plurality of small holes 58-58 with an opening area smaller than that of each of the small holes 57 constituting the first air intake opening 53 and the second air intake opening 54.

Figure 10:
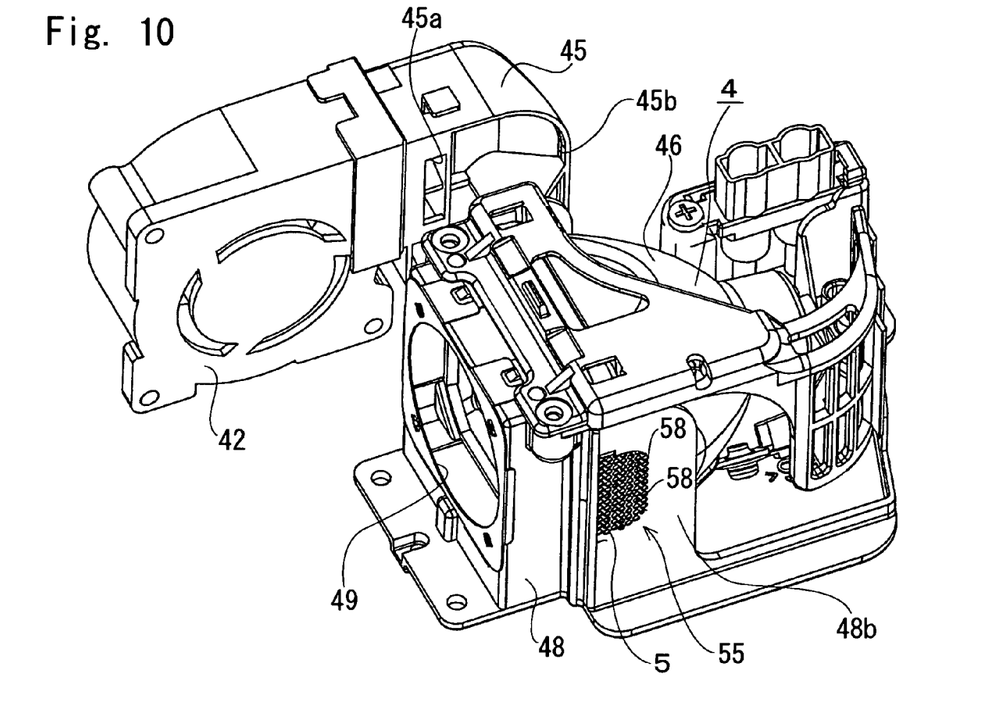
FIG. 10 is a perspective view of a lamp unit, an inlet housing and the cooling fan.
Figure 11:
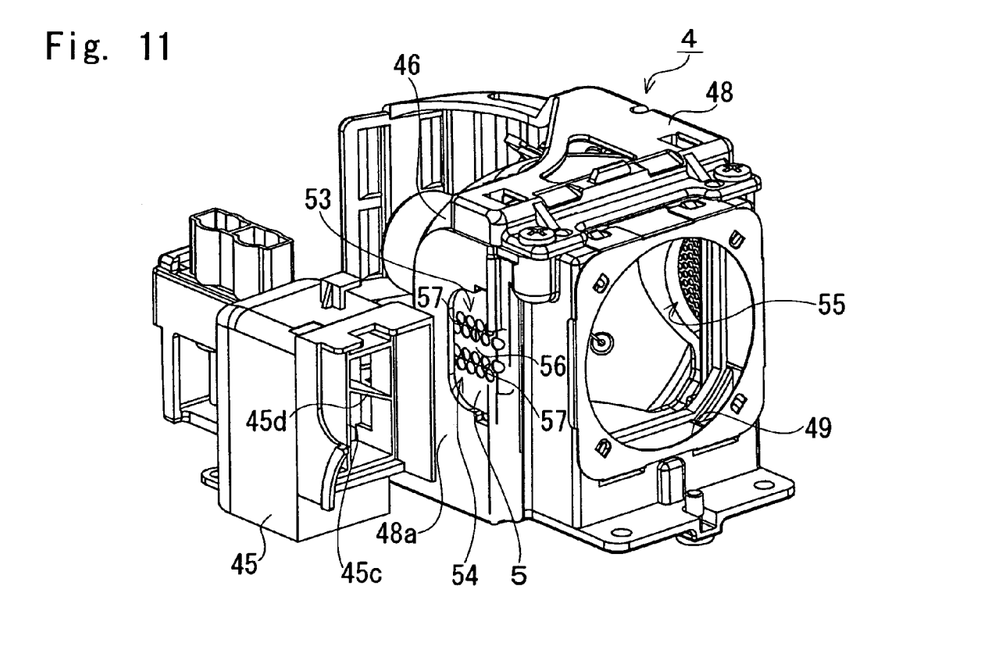
FIG. 11 is a perspective view of the lamp unit and the inlet housing.

As shown in FIG. 10 and FIG. 11, the lamp unit 4 is attached to a lamp unit holder 48 made of a synthetic resin integral mold. A circular lens setting window 49 for setting a lens (not shown) therein is provided on the lamp unit holder 4-8 in a portion opposed to the optical system 2.

The cover member 5 is attached to the lamp unit 4 with the pair of side plates 52a, 52b shown in FIG. 13 held between a pair of side walls 48a, 48b of the lamp unit holder 48 shown in FIG. 10 and FIG. 11 and the pair of side walls 46b, 46c of the lamp unit 4 shown in FIG. 12.

As shown in FIG. 9, air delivered from the lamp cooling fan 42 is introduced through a channel defined in the inlet housing 45 to the first intake 43, the second intake 44a and the third intake 44b of the optical system holding case 7.

As shown in FIG. 10, a first outlet 45a and a second outlet 45b are provided on the inlet housing 45. The first outlet 45a is provided opposed to the first intake 43 of the optical system holding case 7 shown in FIG. 9, and the second outlet 45b is provided opposed to the second intake 44a and third intake 44b of the optical system holding case 7 shown in FIG. 9.

As shown in FIG. 11 and FIG. 12, a first partition wall 45c and a second partition wall 45d are provided inside the inlet housing 45. Both partition walls 45c, 45d define three channels 59a, 59b, 59c shown in FIG. 12.

The air delivered from the lamp cooling fan 42 is separated by the first partition wall 45c and the second partition wall 45d to flow into the three channels 59a, 59b, 59c.

The air flowing through a first channel 59a and a second channel 59b is introduced through the first outlet 45a of the inlet housing 45 shown in FIG. 10 and the first intake 43 of the optical system holding case 7 shown in FIG. 9 from the first air intake opening 53 and the second air intake opening 54 shown in FIG. 11 inside the reflector 46.

The air flowing through a third channel 59c shown in FIG. 12 is delivered through the second outlet 45b of the inlet housing 45 shown in FIG. 10 from the second intake 44a and third intake 44b of the optical system holding case 7 shown in FIG. 9 toward a back surface of the reflector 46.

The air to be introduced inside the reflector 46 is forced to diverge toward an upper area and a lower area of the light emitting portion 41b of the lamp 41 because, as shown in FIG. 12, the first air intake opening 53 and the second air intake opening 54 are provided at both sides of the plane including the central axis of the lamp 41 and orthogonal to the first side wall 46b of the reflector 46, with the wind blocking wall 56 defined between both intake openings 53, 54.

Therefore, according to the projector device of the present invention, less air than a conventional amount flows straight toward the air discharge opening 55.

This causes more air than a conventional amount to flow around the light emitting portion 41b of the lamp 41. Consequently, the light emitting portion 41b of the lamp 41 can be sufficiently cooled.

Furthermore, because each of the small holes 57 constituting the first air intake opening 53 and the second air intake opening 54 shown in FIG. 12 has a larger opening area, only a small pressure loss occurs when the air delivered from the lamp cooling fan 42 passes through each of the small holes 57. This results in increased cooling effect for the light emitting portion 41b of the lamp 41.

Because the air delivered from the lamp cooling fan 42 flows inside the reflector 46 from the first air intake opening 53 and the second air intake opening 54 toward the air discharge opening 55, small broken pieces flying toward the first air intake opening 53 and the second air intake opening 54 upon explosion of the lamp 41 will be swept by the air flow toward the air discharge opening 55. Therefore, the small broken pieces are prevented from flying outside the reflector 46 from the first air intake opening 53 and the second air intake opening 54.

Further, the small broken pieces are unlikely to fly outside the reflector 46 also from the air discharge opening 55 because each of the small holes 58 constituting the air discharge opening 55 is formed with the opening area smaller than that of each of the small holes 57 constituting the first air intake opening 53 and the second air intake opening 54.

Therefore, according to the liquid crystal projector device of the present invention, it is possible to suppress to a minimum the pressure loss occurring when the air delivered from the lamp cooling fan 42 passes through each of the small holes 57 constituting the first air intake opening 53 and the second air intake opening 54, while preventing the broken pieces of the lamp 41 from flying outside the reflector 46 upon the explosion.

Furthermore, according to the lamp unit 4 of the projector device of the present invention, the first opening 47a and second opening 47b of the reflector 46 can be covered by the single cover member 5 shown in FIG. 13, and therefore the number of components is reduced more than conventionally. This can result in simplification of the assembly process and cost reduction.

The present invention is not limited to the foregoing embodiment in construction but can be modified variously by one skilled in the art without departing from the spirit of the invention as set forth in the appended claims. For example, the first air intake opening 53, the second air intake opening 54 and the air discharge opening 55 may each be formed from one opening, although in the present embodiment the first air intake opening 53, the second air intake opening 54 and the air discharge opening 55 are each constituted of the plurality of small holes 57, 58.

What is claimed is:

1. A projector device comprising:
   a casing (1) having disposed therein a lamp unit (4) comprising a lamp (41) and a reflector (46), a cooling unit comprising a cooling fan (42) for cooling the lamp unit (4), and an optical system for generating color image light with the lamp unit (4) serving as a light source, the reflector (46) having a reflecting portion (46a) having a reflecting surface for reflecting light emitted from the lamp (41) toward the optical system, and a plurality of side walls (46b-46e) extending from the reflecting portion (46a) toward the optical system to surround the lamp (41), a first side wall (46b) of the plurality of side walls (46b-46e) being provided with an air intake portion for introducing air delivered from the cooling unit toward the lamp (41), with a second side wall (46*c*) opposed to the first side wall (46*b*) being provided with an air discharge opening (55) opposed to the air intake portion, the air intake portion of the reflector (46) being provided with a first air intake opening (53) and a second air intake opening (54) at both sides of a plane including a central axis of the lamp (41) and orthogonal to the first side wall (46*b*), with a wind blocking wall (56) being defined between both air intake openings (53, 54), wherein the first air intake opening (53), the second air intake opening (54) and the air discharge opening (55) are each constituted of a plurality of small holes (57, 58), and each of the small holes (57) constituting the first intake opening (53) and the second intake opening (54) has an opening area larger than that of each of the small holes (58) constituting the air discharge opening (55).

2. The projector device according to claim 1, wherein a first opening (47*a*) for introducing the air delivered from the cooling unit toward a light emitting portion (41*b*) of the lamp (41) is formed on the first side wall (46*b*) of the reflector (46), while a second opening (47*b*) opposed to the first opening (47*a*) is formed on the second side wall (46*c*), the lamp unit (4) having attached thereto a cover member (5) for covering the first opening (47*a*) and second opening (47*b*) of the reflector (46), the cover member (5) having the first air intake opening (53) and the second air intake opening (54) provided in a position opposed to the first opening (47*a*), and the air discharge opening (55) provided in a position opposed to the second opening (47*b*).

* * * * *